United States Patent [19]

Fond et al.

[11] Patent Number: 5,398,595
[45] Date of Patent: Mar. 21, 1995

[54] DEVICES FOR EXTRACTING BEVERAGE MATERIALS IN CARTRIDGES

[75] Inventors: Olivier Fond, Yverdon; Alfred Yoakim, La Tour-De-Peilz, both of Switzerland

[73] Assignee: NEstec S.A., Vevey, Switzerland

[21] Appl. No.: 899,377

[22] Filed: Jun. 16, 1992

[30] Foreign Application Priority Data

Jul. 5, 1991 [EP]  European Pat. Off. ............ 91111211

[51] Int. Cl.⁶ ............................................. A47J 31/24
[52] U.S. Cl. .................................... 99/295; 99/302 R
[58] Field of Search ..................... 99/295, 300, 302 R, 99/307, 316

[56] References Cited

U.S. PATENT DOCUMENTS

| | | | |
|---|---|---|---|
| 726,793 | 4/1903 | Bezzera | 99/302 R |
| 1,493,984 | 5/1924 | Iglesias | 99/302 R |
| 1,750,068 | 3/1930 | Torriani | 99/302 R |
| 2,154,845 | 4/1939 | Hegwein | 99/302 R |
| 2,451,195 | 10/1948 | Brown | 99/295 |
| 2,715,868 | 8/1955 | Brown | 99/302 R |
| 2,899,886 | 8/1959 | Rodth | 99/295 |
| 2,968,560 | 1/1961 | Goros | 99/295 |
| 3,030,874 | 4/1962 | Fiori | 99/302 R |
| 3,055,286 | 9/1962 | Valente | 99/302 R |
| 3,295,998 | 1/1967 | Goros | 99/282 |
| 3,349,690 | 10/1967 | Heier | 99/302 R |
| 3,607,297 | 9/1971 | Fasano . | |
| 4,429,623 | 2/1984 | Illy | 99/295 |
| 4,846,052 | 7/1989 | Favre et al. | 99/302 R |

FOREIGN PATENT DOCUMENTS

| | | | |
|---|---|---|---|
| 0006175 | 1/1980 | European Pat. Off. . | |
| 771447 | 10/1934 | France | 99/302 R |
| 1167814 | 12/1958 | France | 99/302 R |
| 1381849 | 11/1964 | France | 99/302 R |
| 7430109 | 3/1976 | Germany . | |
| 8908315 | 10/1989 | Germany . | |
| 447690 | 4/1949 | Italy | 99/302 R |
| 533076 | 9/1955 | Italy | 99/302 R |
| 0458099 | 8/1968 | Switzerland . | |
| 0605293 | 9/1978 | Switzerland . | |

*Primary Examiner*—Mark Spisich
*Attorney, Agent, or Firm*—Vogt & O'Donnell

[57] ABSTRACT

Devices for being fitted to a beverage making machine extraction head have a ring member which has a wall which extends to define a hollowed interior portion suitable for being fitted about a periphery of a coffee machine water injection system extraction head which surrounds a water injection passage. The hollowed interior is defined further by a base connected to and disposed transversely with respect to the wall. The base may be a ring wall portion which provides a grill and which has projections extending therefrom, or may be a ring wall portion which has a hole therethrough and which has projections extending therefrom, or may be a ring wall portion which has a centrally disposed needle portion which contains at least one opening so that upon the ring member being fitted about the extraction head, the base is positioned adjacent a base of the extraction head, and so that the projections or needle are positioned to extend away from the extraction head base. The devices also include a cartridge holder, which may be an element integral with the ring member or separate therefrom, and a cartridge holder support.

16 Claims, 7 Drawing Sheets

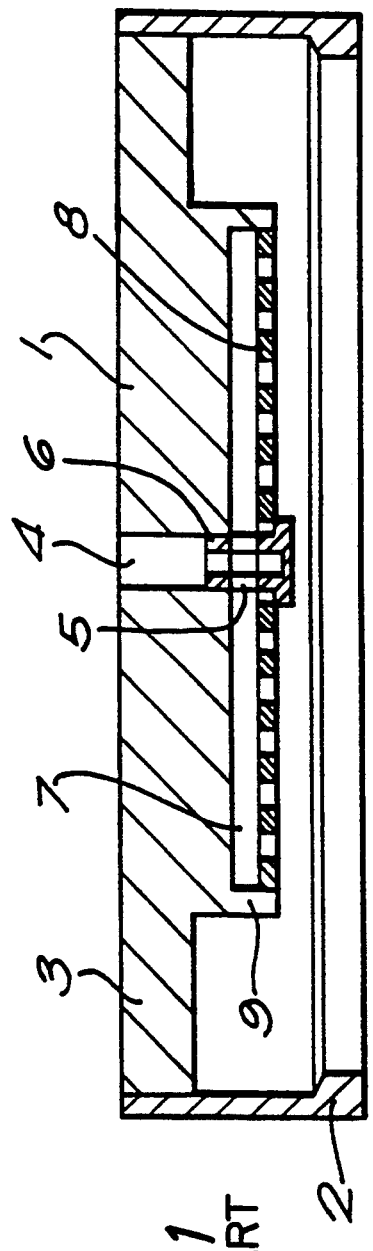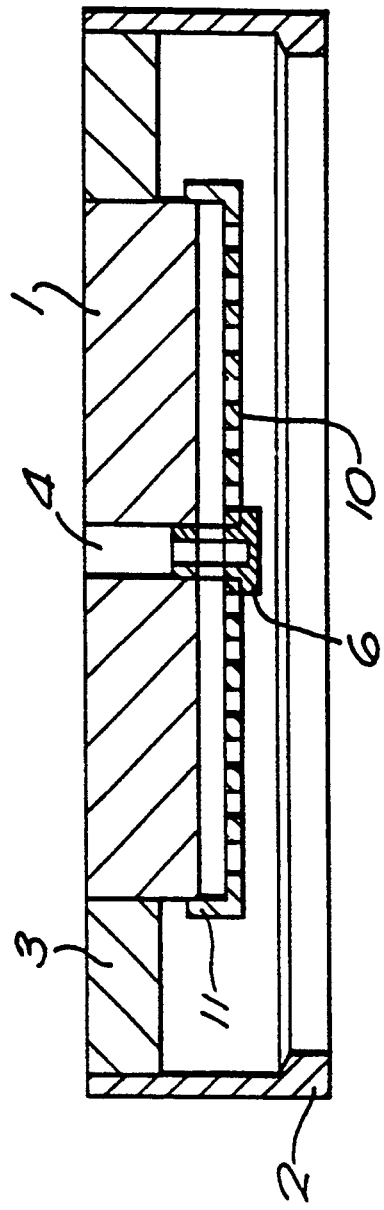
FIG. 1
PRIOR ART
FIG. 2
PRIOR ART

DEVICES FOR EXTRACTING BEVERAGE MATERIALS IN CARTRIDGES

BACKGROUND OF THE INVENTION

This invention related to detachable devices for the extraction of cartridges which is designed to fit onto a commercial espresso coffee machine.

Swiss Patent No. 458 099 relates to an installation for the preparation of a beverage from a cartridge containing soluble coffee. This system is not of the espresso coffee machine type and does not comprise adaptable and detachable elements.

Ordinarily, espresso type coffee machines are used to extract ground coffee which has been measured out and placed beforehand in a metal filter held in a receptacle.

The upper part of espresso type coffee machines consists of a spray nozzle for spraying the coffee, a tightening ring for fixing the receptacle and a rubber seal designed to ensure fluid-tightness and good extraction by forcing the water to pass through the layer of coffee.

However, the use of this system is laborious and causes soiling and frustration because the quality of the beverage obtained does not always live up to expectations. This is because it is difficult to measure out the coffee correctly and to determine whether it has been properly ground.

The use of coffee capsules, for example those according to Swiss Patent No. 605 293, is a good alternative because handling is simplified, the quality of the coffee is better and constant and the risk of soiling is reduced. Nevertheless, the use of coffee capsules requires perfect compatibility between the capsule and the extraction system essentially for reasons of fluid-tightness and to force the water through the layer of coffee.

This compatibility may be embodied in the design of the machine although, in this case, the machine generally allows the use of capsules only.

SUMMARY OF THE INVENTION

The problem addressed by the present invention was to provide complete detachable devices which would enable coffee capsules to be extracted in any espresso coffee machines without involving any modification thereto.

The devices according to the invention may be used for the extraction both of inverted frustum capsules and also frustoconical, hemispherical or cylindrical capsules, their cross-section not necessarily having to be circular. Where the term "receptacle" is used in the present specification in connection with normal espresso machines, the term "cartridge holder support" is used to designate the same object in the extraction of cartridges (or capsules).

The present invention provides devices for use with water injection coffee extraction machine apparati which include a ring member having an annular portion and a second portion for distributing water, also referred to throughout the disclosure of this specification as a "water collector". The present invention also includes an embodiment wherein the member is configured to provide a cartridge holder portion and includes combinations which include the member and a cartridge holder support.

The water collector member of the invention has an annular portion which has an interior surface suitable for being fitted about a peripheral portion of a coffee machine water injection system extraction head which extends longitudinally from an extraction head base and contains a water passage having an opening in the base for delivery of water from the passage to an extraction head base grill which distributes water. The member has a second portion having first and second opposing surfaces which extend laterally with respect to the annular portion so that the first surface is connected with the annular portion interior surface, as may be appreciated readily from the drawing Figures. The annular portion and its interior surface extend longitudinally from the first surface to an edge displaced from the first surface so that upon the member being fitted to the head, the member edge is fitted adjacent a seal positioned adjacent a surface between the peripheral portion of the extraction head and a portion of a tightening ring positioned coaxial with and displaced by a gap from the head peripheral portion and so that the surface of the member second portion is at a position adjacent an extraction head base grill.

In one embodiment, the second portion first and second surfaces have a plurality of openings which form a member grill portion for distributing water, and projections which are suitable for piercing a cartridge to extend from the member second surface grill in a direction away from the second surface. Thus, upon the member being fitted about the extraction head, a first surface of the grill is positioned adjacent the extraction head base grill and the projections extend from the member second surface in a direction away from the second surface and hence, away from the extraction head base grill.

In another embodiment, the member first and second surfaces are embodied to have a centrally disposed opening in the first surface which extends to a surface portion having at least one opening for distributing water which projects from the second surface. Thus, upon the member being fitted about the extraction head, the first surface is positioned adjacent the extraction head base grill and the projecting portion of the second surface thus extends in a direction away from the base grill.

In a still further embodiment, the annular portion may extend laterally with respect to the member second portion surfaces so that the second portion is disposed intermediately with respect to the annular portion and wherein the annular portion has a second interior surface which forms a cavity adjacent the second member surface portion and which is suitable for surrounding a side of a cartridge positioned in the cavity adjacent the second member portion.

DETAILED DESCRIPTION OF THE INVENTION

The present invention also relates to a device for the extraction of cartridges in the form of inverted frustums which is designed to fit onto an espresso coffee machine and which comprises a cartridge holder support with a handle and tightening lugs adapted to the tightening ring and to the tightening ramps of the machine, a cartridge holder arranged detachably or non-detachably in the cartridge holder support and a water collector which is pivotally mounted on the cartridge holder support, which is designed to be pressed back onto the upper edge of the cartridge holder or to rest on the upper edge of the cartridge holder and which comprises a water distributing grill or a plate with a water injection needle or a single opening at its centre, the cartridge holder and the water collector between them forming a cavity of which the shape is adapted to the outer shape of the cartridge to be extracted.

The invention also relates to a device for the extraction of frustoconical or hemispherical cartridges which is designed to fit onto an espresso coffee machine and which comprises a cartridge holder support with a handle and tightening lugs adapted to the tightening ring and to the tightening ramps of the machine, a cartridge holder arranged detachably or non-detachably in the cartridge holder support and a water collector which is pivotally mounted on the cartridge holder support, which is designed to be pressed back onto the lower border of the recess of the cartridge holder or to rest on that lower border and which comprises a water distributing grill or a plate with a water injection needle or a single opening at its centre, the cartridge holder and the water collector between them forming a cavity of which the shape is adapted to the outer shape of the cartridge to be extracted.

As mentioned above, the devices according to the invention may be used with any commercial espresso coffee machine. Machines of this type have a water distributing grill held by a hollow screw and may comprise a metal rim around their periphery. In addition, commercial espresso coffee machines comprise a seal for the extraction head of the machine surrounding the water distributing grill and optionally raised in relation thereto. The water collector is intended to ensure fluid-tightness on the one hand against the seal of the extraction head and, on the other hand, against the rim of the cartridge by co-operating with the upper rim of the cartridge holder (for the extraction of cartridges in the form of inverted frustums) or against the rim of the cartridge by co-operating with the lower border of the recess of the cartridge holder (frustoconical or hemispherical cartridges).

To ensure perfect fluid-tightness of the arrangement as a whole, the tightening effect has to be applied from the cartridge holder which bears against the water collector and which transmits this pressure to the seal of the extraction head of the machine through the tightening lugs of the cartridge holder support.

A seal positioned in a groove can be interposed between the co-operating parts of the cartridge holder and the water collector. This seal is disposed either on the lower part of the collecting element or on the upper part of the cartridge holder (inverted frustum cartridges). The sealing system may be the same as that according to European Patent Application No. 92101389.2

The water collector may be simply designed to rest on the cartridge holder.

The water collector may also be integral with the cartridge holder support, although it must remain vertically displaceable in order not to compromise the tightening effect or fluid-tightness, as was seen earlier on.

The water collector may be pivoted relative to the handle by any known means, for example by means of a toothed wheel or a system of lugs.

In this case, the collector may comprise two vertical lugs astride the handle of the cartridge holder support. These lugs are formed with two vertically extending ovoidal openings. A pin passing horizontally through the handle enables the collector to be fixed horizontally to the grip while allowing it a degree of movement in the vertical direction.

In order to make the cartridge easier to manipulate with respect to the cartridge holder, the water collector may comprise a further lug which is designed to be manipulated by the thumb of the operator who holds the handle of the cartridge holder support and which, at rest, forms an angle of 20° to 70° with the horizontal. By returning the lug to the horizontal, the collector is raised and the cartridge can thus be manipulated (placed in position or released). The water collector may also be connected to a return spring fixed to the handle which enables the water collector to be returned to the cartridge holder after the abovementioned lug has been released.

The water collector has to be dimensioned in such a way that it can be retained against the seal of the extraction head without interference from the water distributing grill or the extraction head of the machine, but without leaving too much free space between itself and the extraction head, this space being filled with water during each extraction cycle and being able to expand during release of the device after extraction of the cartridge.

The cartridge holder may be independent (detachable) of the cartridge holder support or may form an integral part thereof (non-detachable). In this case, the cartridge holder support is considered to correspond to the exterior of the common collector while the cartridge holder essentially corresponds to the interior of that element opposite the cartridge.

The cartridge used in the devices according to the invention may be the cartridge according to European Patent Application No. 91107650.3. It is also possible to use the cartridges according to European Patent Applications Nos. 90114404.8 and 90114405.5.

The cartridge used to carry out the process according to the invention may also be selected from those according to the European patent applications filed by applicants on the same day as the present application under the titles "A rigid pack and a process for its production" (EP 91111213. 4), "A flexible pack with a stiffening element and a process for its production" (EP 91111214.2) and "An open flexible pack and a process for its production" (EP 91111209. 2). It has a diameter of preferably between 2.5 and 6 cm and a coffee layer thickness between 10 and 25 mm.

The cartridge may contain ground and roasted coffee, but also tea, soluble coffee, a mixture of ground coffee and soluble coffee, a chocolate-flavoured product or a soup and is intended for the preparation of beverages or foods in the form of infusions.

If the cartridge is open before extraction, the water collector has several perforations or a single opening in the zone co-operating with the upper face of the cartridge to allow the water to pass from the water distributing grill of the machine into the cartridge. Similarly, the lower part of the cartridge holder has a single flow grill which co-operates with the lower face of the cartridge.

Although reference is made to closed cartridges of which the quality resides in the fact that they open automatically on extraction, considerably simplifying the manipulations and ensuring ultimate quality by protecting the coffee against oxygen until the last moment before extraction, it is important to mention the device which is responsible for this opening. This opening has to be twofold, namely, on the upper face to allow water to be introduced and on the lower face to allow removal of the extracted coffee.

To open the upper face of the cartridge, the water collector is formed by a water distributing grill provided on its lower face with a few projecting points, foils or crosses which tear the upper face of the cartridge. These projecting elements may be vertical or slightly angled to increase the size of the tears made in the cartridges.

In another embodiment, the water distributing element of the water collector comprises a single opening with projecting elements supported by optionally radial pins integral with the collector.

The water enters the cartridge without difficulty because, under the effect of the water pressure, the upper flexible membrane is able to flex slightly and thus to release the openings formed by the projecting elements.

These projecting elements are formed, for example, by frustoconical points between 2 and 7 mm in height with an average diameter of 2 to 5 mm or by small foils or crosses between 2 and 7 mm in height and between 1 and 3 mm in thickness cut slightly in a crest.

These elements, which are preferably between 3 and 10 in number, are distributed over the lower face of the water collector in the zone corresponding to the upper internal diameter of the body of the cartridge.

Another solution for the opening of the upper face of the cartridge is to provide on the water collecting element a plate with a water injection needle at its centre, for example of the type described in European Patent Application No. 90114402.2 filed 27th July, 1990.

The lower face may be opened by the method and part of the device according to European patent application no. 92101389.2. The device, which consists of relief and recessed elements arranged on the flow grill of the cartridge holder, has to be suitably adapted for this purpose.

The lower face may also be opened with the device according to European Patent Applications Nos. 90114401.4 and 90114403.0, i.e., with a cartridge holder comprising a central finger on its lower part, optionally with radial fins.

The invention is described in more detail with reference to the accompanying drawings.

BRIEF DESCRIPTION OF THE DRAWING

FIG. 1 diagrammatically illustrates the extraction head and the tightening ring of a standard espresso machine.

FIG. 2 diagrammatically illustrates the extraction head and the tightening ring of a standard espresso machine in another configuration.

DETAILED DESCRIPTION OF THE DRAWINGS

Figure 3:
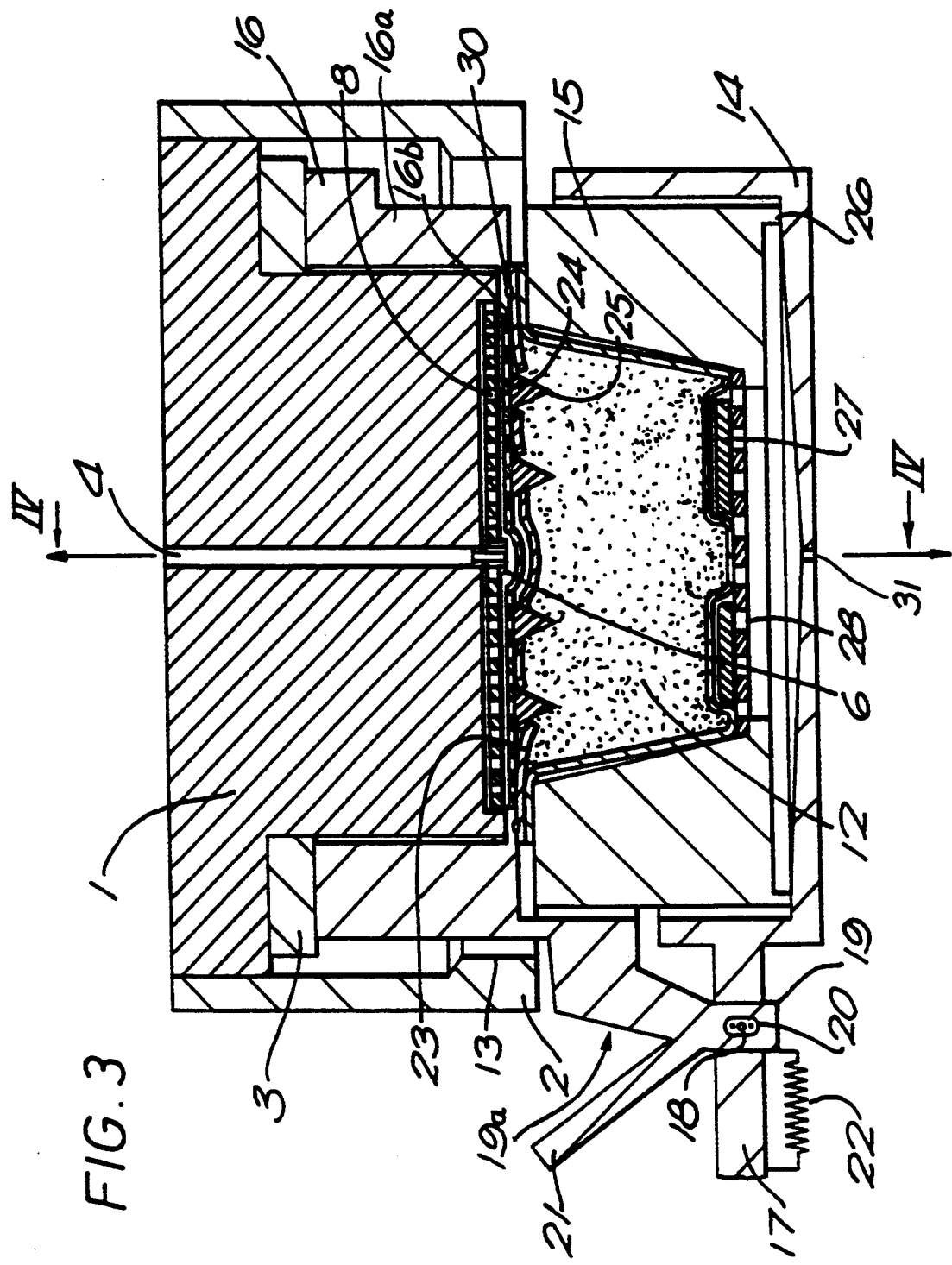
FIG. 3 is a section through the cartridge to be extracted and through a device according to the invention.

FIG. 1 shows a conventional extraction head (1) of an espresso type coffee machine. It comprises a tightening ring (2) for the receptacle (not shown). The seal (3) establishes fluid-tightness during the extraction process. The water arrives through the passage (4) and passes through the orifices (5) of the hollow screw (6) for distribution in the chamber (7). It then passes through the water distributing grill (8) to impinge in the form of a spray on the layer of coffee (not shown). The grill (8) is held by rim (9) which extends to be positioned between seal (3) and the extraction head member which contains passage (4) and in a cylindrical recess positioned between the inner surface of grill rim (9) which extends as a peripheral portion of the extraction head.

FIG. 2 shows a second embodiment of the extraction head. The same parts are denoted by the same reference numerals as in FIG. 1. In this case, the grill (10) has a metal rim (11).

Figure 4:
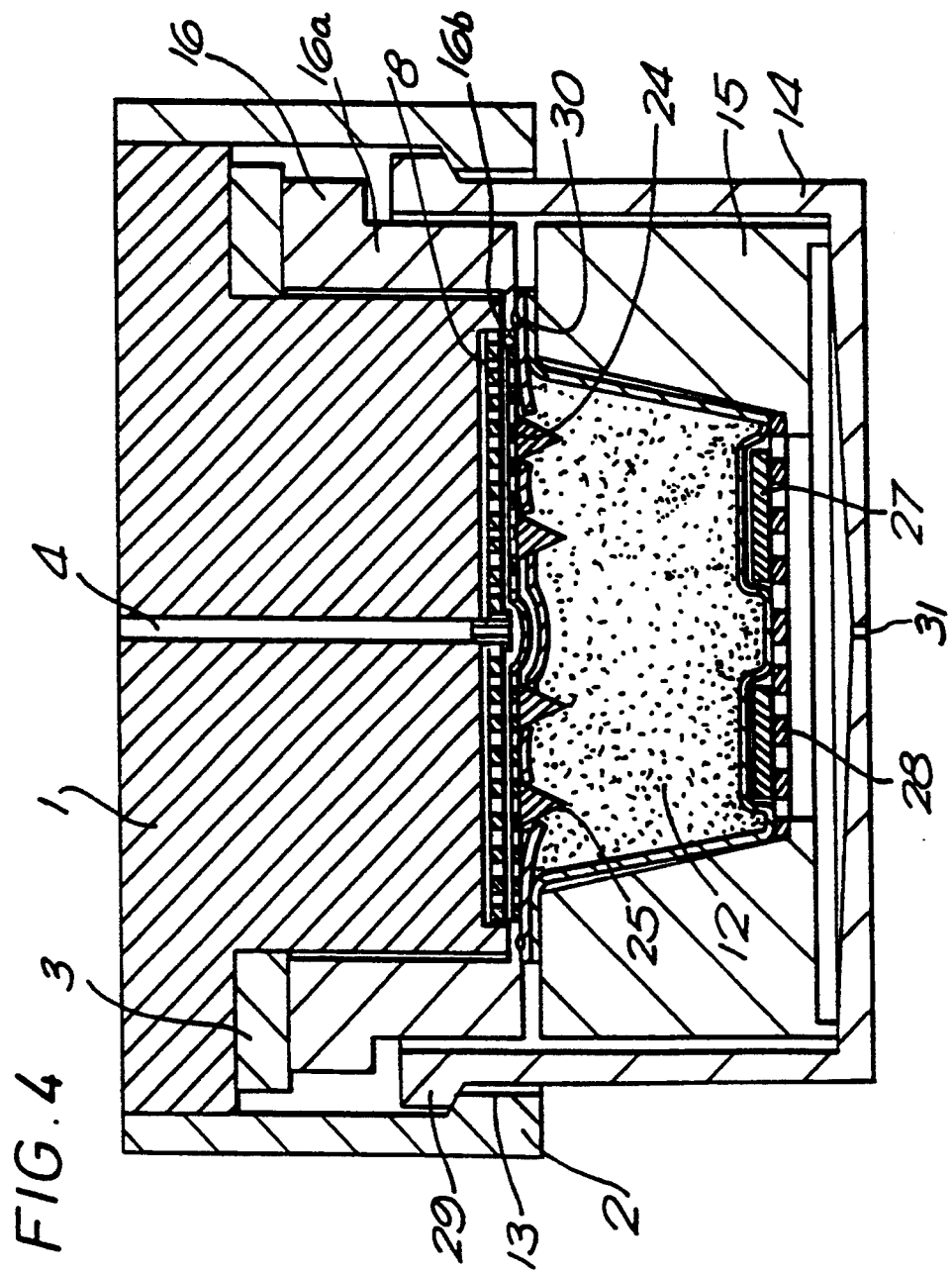
FIG. 4 is a section on the line IV—IV of FIG. 3.

FIGS. 3 and 4 show a device according to the invention for the extraction of a closed cartridge in the form of an inverted frustum (12) with the extraction head shown in FIG. 1. This device comprises a cartridge holder support (14) with a handle (17), a cartridge holder (15) arranged in the support (14) and a water collector (16).

As illustrated in FIGS. 3 and 4, water collector member (16) has a first annular portion (16a) which has an interior surface suitable for being fitted about the peripheral portion of the coffee machine water injection system extraction head (1) which, in turn, surrounds water passage (4) which extends to an opening in the base of the extraction head. Member (16) has a second portion (16b) which has first and second opposing surfaces which extend laterally with respect to the annular portion so that the first surface is connected with the annular portion interior surface and which have a plurality of openings which form a member grill portion (24) for distributing water. Projections (25) extend from the second surface grill.

Annular portion (16a) and its interior surface extend longitudinally to an edge displaced from the first surface so that upon member (16) being fitted about extraction head (1), the member edge is fitted against seal (3) and so that the member first surface is positioned adjacent the extraction head base grill (8), and the projections extend in a direction away from the extraction head base. The projections thus are positioned for piercing an upper face (23) of a cartridge for extraction.

Seal (30) provides for fluid-tightness between cartridge face (23) and the member second portion (16b), and cartridge holder (15), which includes projecting elements (27) on its base, for opening the cartridge.

The cartridge holder has an exterior base and an annular exterior side surface which extends from the exterior base and has an interior base surface for supporting a cartridge and an annular interior side surface which extends laterally from the base for surrounding a side of the cartridge for holding the cartridge adjacent the member grill second surface. As illustrated, the holder interior base includes a flow grill (28) and the exterior base surface includes an annular protuberance (26) supported within the hollowed annular interior of cartridge holder support (14) by an interior base surface of the support which also has an interior side surface for surrounding the exterior surface of holder member (15). Support (14) also has an exterior surface having lugs extending therefrom for engaging the tightening ring for positioning holder member (15) and cartridge against the member second surface so that the cartridge is pierced and for extraction of the beverage substance.

The collector (16) is mounted for rotation on the handle (17) by lugs (19) astride handle (17) which are held in place by means of a nut (18). The collector lugs overlap the handle (17) through extensions (19a). These extensions have vertically extending ovoidal openings (20). The nut (18), which passes horizontally through the handle (17), enables the collector (16) to be fixed to the handle although the ovoidal openings (20) allow it some freedom of movement in the vertical direction. This freedom is necessary to guarantee the tightening effect and the fluid-tightness of the device according to the invention. Provided on the collector (16) is a further lug (21) designed for manipulation by a finger of the hand of the user to lift the collector in order to enable the cartridge (12) to be placed in position or removed. The bottom of the extension (19a) is connected to a return spring (22) fixed to the handle which provides for automatic return of the collector (16) to the cartridge holder (15).

In operation, the cartridge holder (15), the support (14) and the collector (16) are released from the extraction head, the collector (16) is lifted by a finger via the lug (21) and the spent cartridge is removed, a new cartridge (12) to be extracted is placed in position and the return spring (22) returns the collector (16) to the cartridge holder (15). This assembly is engaged by its tightening lugs (29) on the tightening ramps (13) of the tightening ring (2). The projecting elements (25) pierce the upper face of the cartridge, and the seal (30) guarantees effective fluid-tightness during the extraction process. The extraction process may then be started. The water arrives through the passage (4), passes through the grill (8) of the extraction head and the grill (24) of the collector (16) and diffuses into the cartridge (12) through the holes formed by the projecting elements (25). The lower face of the cartridge (12) bears against the projecting elements (27), the lower face tearing at the location of these projecting elements on reaching its breaking strain. The coffee then flows through the orifice (31) of the cartridge holder support into a container (not shown).

Figure 5:
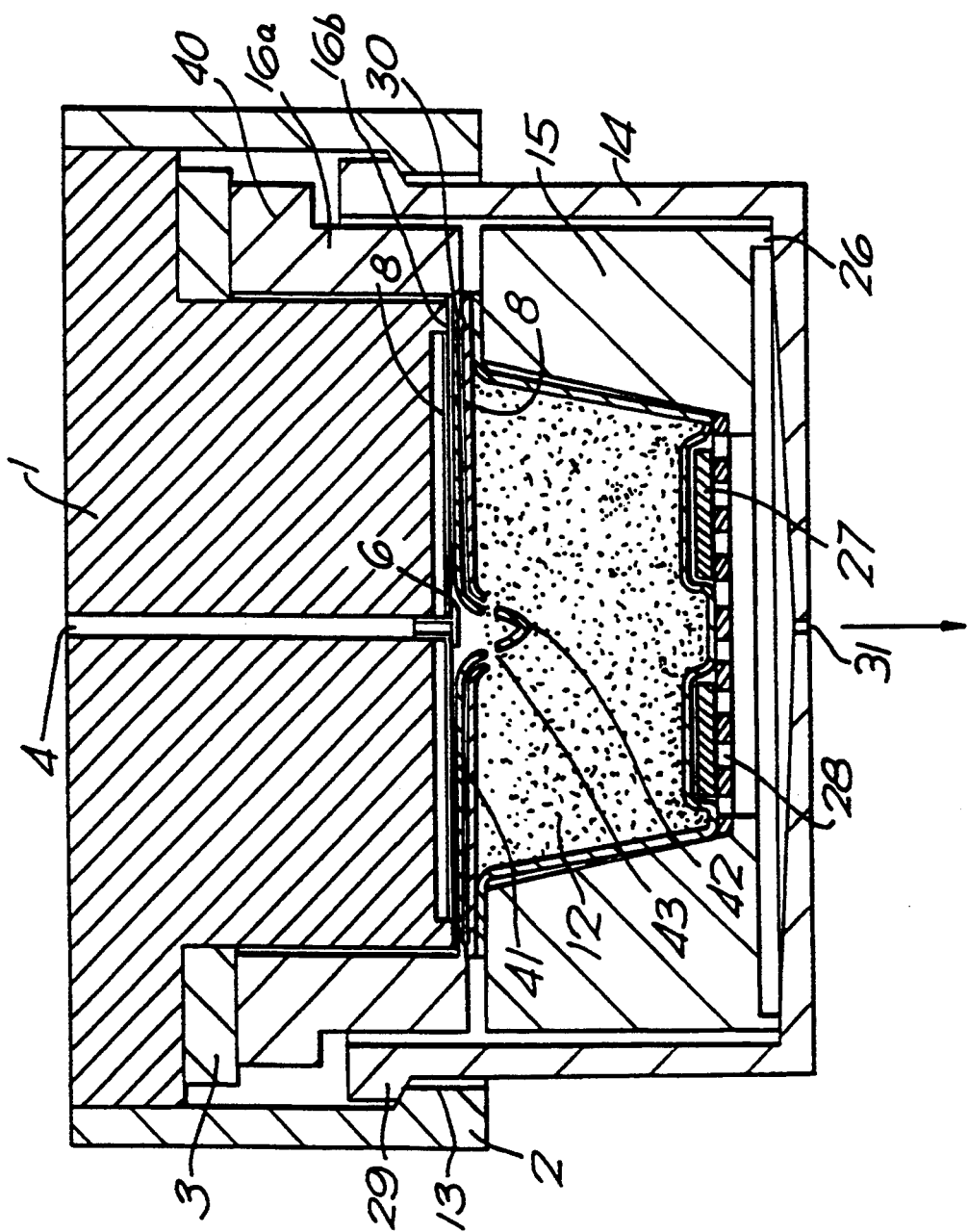
FIG. 5 is a section through a second embodiment of a device according to the invention.

In FIG. 5, the same parts are denoted by the same reference numerals as in FIGS. 3 and 4. The section is taken in the same way as in FIG. 4, i.e., it does not show the lugs for lifting the water collector. The only difference in relation to FIGS. 3 and 4 lies in the water collector (40) which, instead of having a grill for the passage of water, comprises a plate (41) with a water injection needle (42) at its centre.

The device operates similarly to the device illustrated in FIGS. 3 and 4. The cartridge (12) is introduced into the cartridge holder (15). The water collector (40) is pressed onto the cartridge holder, the water injection needle (42) piercing the upper face of the cartridge (12). The assembly is engaged on the locking ramps (13) of the tightening ring. (2). The extraction process may then be started. The water arrives through the passage (4), passes through the grill (8) and, since the plate (41) is closed, the water is forced to pass through the openings (43) of the water injection needle (42). Under the effect of the water pressure, the lower face of the cartridge (12) bears against the projecting elements (27), the lower face tearing at the location of these projecting elements on reaching its breaking strain. The coffee flows onto the flow grill (22) through the orifice (31) of the cartridge holder support.

Figure 6:
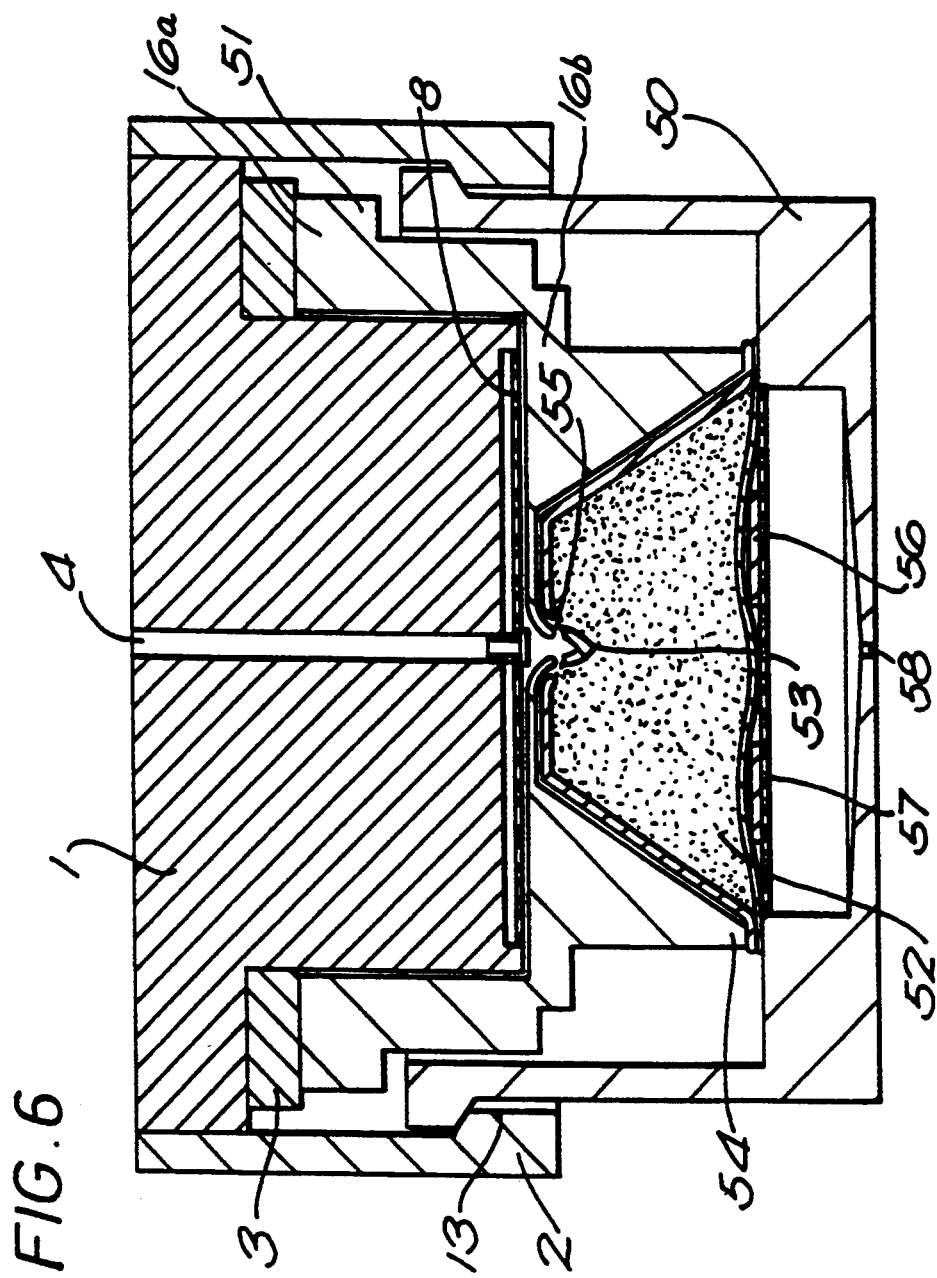
FIG. 6 is a section through a third embodiment of a device according to the invention.

FIG. 6 is a section in the same plane as FIGS. 4 and 5 and shows the device according to the invention for the extraction of frustoconical cartridges. The only similarity with FIGS. 3 to 5 concerns the extraction head (1). The water collector and the cartridge holder are in one piece. The extraction head need not be described in any more detail. The device comprises a cartridge holder support (50) and a integral water collector cartridge holder (51). The water collector is mounted for rotation on the handle of the cartridge holder, as shown in FIG. 3. Opposite the upper face of the cartridge (52) to be extracted, the water collector and holder (51) comprises a water injection needle (53) and extends downwards to define a recess for the cartridge (52). The lower part (54) rests on the bottom of the recess of the cartridge holder support (50).

In operation, the cartridge is introduced into the cartridge holder support (50) and the water collector (51) is pressed against the cartridge upper face and the injection needle (53) pierces the upper face of the cartridge. The extraction process may then be started. The water arrives through the passage (4), passes onto the grill (8) and is forced to pass through the openings (55) of the injection needle (53) onto the layer of coffee. Under the effect of the increase in pressure, the lower face of the cartridge (52) bears against the projecting elements (56), the lower face tearing at the location of these projecting elements on reaching its breaking strain. The coffee flows onto the grill (57) through the orifice (58) of the cartridge holder support into a container (not shown).

Figure 7:
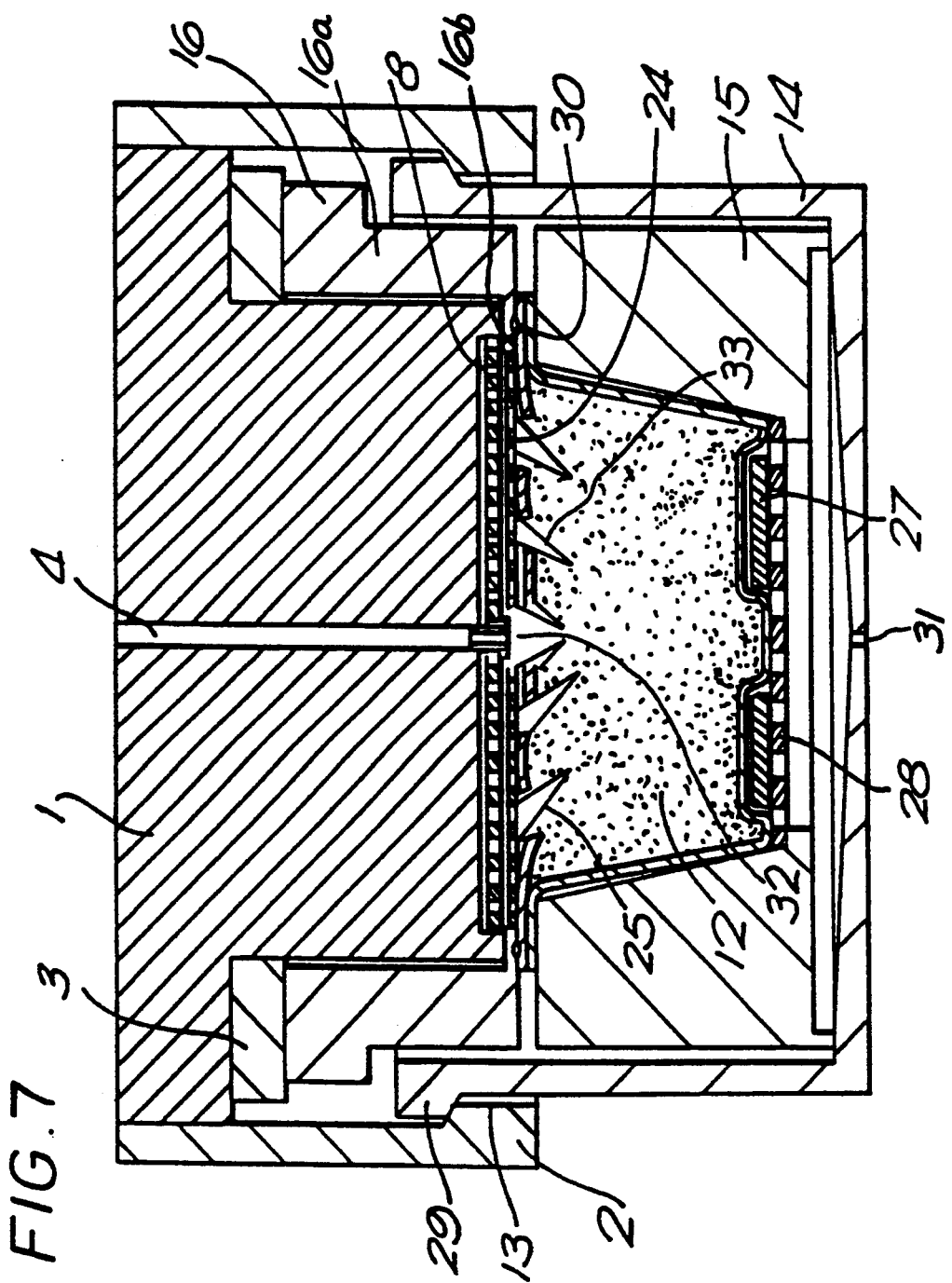
FIG. 7 is a section through a further embodiment of a device according to the invention.

In FIG. 7, the same parts are denoted by the same reference numerals as above. FIG. 7 illustrates a device in which the water distributing element has an opening (32) and having projections (33).

Figure 8:
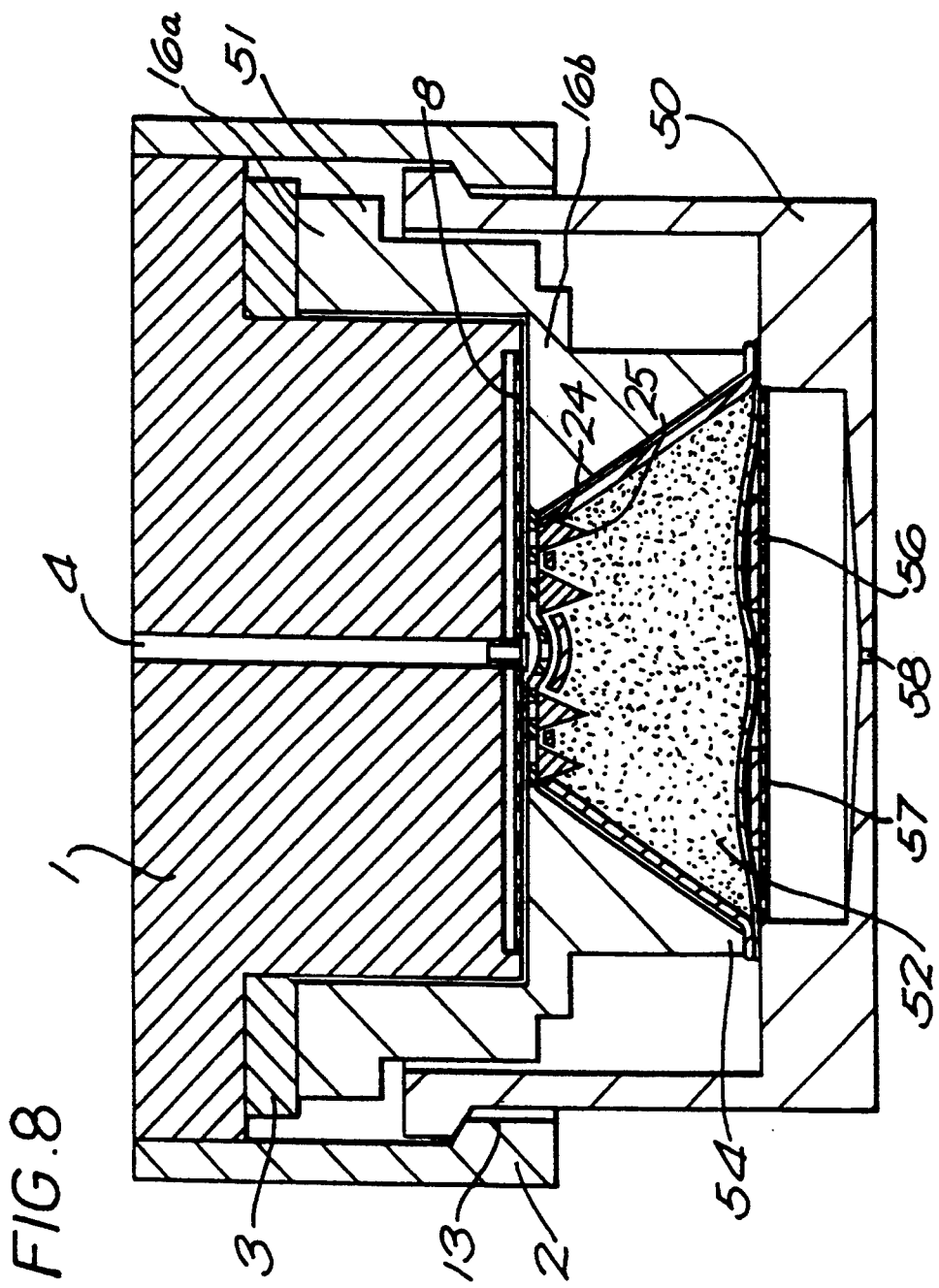
FIG. 8 is a section through a further embodiment of a device according to the invention.

In FIG. 8, the same parts are denoted by the same reference numerals as in FIG. 6 above. Whereas FIG. 6 illustrates a water collector member which has a second portion having a portion which projects from the second surface of the second portion, FIG. 8 illustrates a device in which the water distributing collector member has a grill member portion (24) and projections (25) which project from the second surface of the second portion. In addition, each of FIGS. 6 and 8 employ reference character (16b) to identify the extension of the annular portion which extends laterally with respect to the second portion surfaces so that the second portion first and second surfaces and projecting portion (FIG. 6) and grill member portion (FIG. 8) are disposed intermediately with respect to the annular portion, the annular member portion thereby having a second interior surface which, as illustrated, is adjacent the member second surface and which is suitable for surrounding a side of a cartridge positioned in the cavity adjacent the member second surface.

FIG. 8 also illustrates, as in FIG. 6, a support member (50) having a hollowed annular interior and an interior base surface suitable for supporting an edge of a cartridge and having an exterior surface having lugs extending therefrom positioned for engaging the tightening ramps for positioning a surface of the cartridge adjacent the second member surface so that the projecting portion (FIG. 6) or the projecting elements (FIG. 8) pierce the cartridge and for extraction of the beverage material.

The advantage of the device according to the invention is that they can be used in known and commercially available espresso machines. It is sufficient to purchase the devices according to the invention adapted to the type of cartridge to be extracted.

We claim:

1. A device for use with a water injection coffee extraction apparatus of the type having an extraction head and a tightening ring disposed about the extraction head, wherein the extraction head has a base, a water passage opening in the base, a base grill for distributing water from the opening, a peripheral portion which extends longitudinally from the base, a surface portion which extends laterally from the peripheral portion, and a seal positioned adjacent the surface portion and wherein the tightening ring is fitted to the head and has a portion which extends coaxially about and which is displaced away from the head peripheral portion to form a gap which extends between the tightening ring portion and the head peripheral portion in which the seal is disposed and wherein the tightening ring has ramps which extend into the gap, the device comprising:

a member having an annular portion which extends longitudinally to an edge and which has an interior surface adapted to be fitted about the head peripheral portion whereby the annular portion extends into the gap and having a second portion which has first and second opposing surfaces which extend laterally with respect to the annular portion so that the first surface is connected with the annular portion interior surface and which have a plurality of openings which form a member grill portion for distributing water and wherein the first surface is displaced from the edge so that upon the member being fitted to the head, the edge is fitted against the seal and so that the first surface is positioned adjacent the head base grill; and projecting elements positioned to extend from the member second surface in a direction away from the second surface for piercing a cartridge which contains a substance for preparation of a beverage.

2. A device according to claim 1 wherein the annular portion further extends laterally with respect to the member second portion surfaces so that the second portion is disposed intermediately with respect to the annular portion and wherein the annular portion has a second interior surface portion which forms a cavity adjacent the member second surface so that upon positioning a cartridge which contains a substance for preparation of a beverage in the cavity adjacent the member second surface, the member second interior surface portion surrounds a side of the cartridge.

3. A device according to claim 1 further comprising (a) annular portion lugs which extend from an outer periphery of the annular portion, (b) a holder having a hollowed interior and a base surface for containing and supporting a cartridge which contains a substance for preparation of a beverage at a position adjacent the member second surface for piercing the cartridge and extraction of the substance, (c) a support member having a base surface for supporting the holder, an annular sidewall about a hollowed interior having an interior surface which extends from the base surface and having an exterior surface, tightening lugs which extend from the exterior surface, and a handle which extends from the exterior surface, wherein the support member is configured so that upon positioning of the holder containing and supporting a cartridge which contains a substance for preparation of a beverage in the support member and at a position adjacent the member second surface for piercing the cartridge and extraction of the substance, the sidewall extends into the gap and the tightening lugs extend from the exterior surface at a position for engaging the tightening ring ramps for supporting the support member, and the handle extends from the exterior surface at a position for being positioned adjacent the annular portion lugs, and further comprising (d) a pivotal connection to secure the annular portion lugs to the handle to bias the annular portion lugs and handle.

4. A device for use with a water injection coffee extraction apparatus of the type having an extraction head and a tightening ring disposed about the extraction head, wherein the extraction head has a base, a water passage opening in the base, a base grill for distributing water from the opening, a peripheral portion which extends longitudinally from the base, a surface portion which extends laterally from the peripheral portion, and a seal positioned adjacent the surface portion and wherein the tightening ring is fitted to the head and has a portion which extends coaxially about and which is displaced away from the head peripheral portion to form a gap which extends between the tightening ring portion and the head peripheral portion in which the seal is disposed and wherein the tightening ring has ramps which extend into the gap, the device comprising:

a member having an annular portion which extends longitudinally to an edge and which has an interior surface adapted to be fitted about the head peripheral portion whereby the annular portion extends into the gap and having a second portion which has first and second opposing surfaces which extend laterally with respect to the annular portion, so that the first surface is connected with the annular portion interior surface, and which has a centrally disposed opening in the first surface which extends to a second surface portion which projects from the second surface for piercing a cartridge which contains a substance for preparation of a beverage and which has at least one opening for distributing water and wherein the first surface is displaced from the edge so that upon the member being fitted to the head, the edge is fitted against the seal so that the first surface is positioned adjacent the head base grill so that the member is positioned for piercing and distributing water to a cartridge which contains a substance for separation of a beverage so that the head base grill distributes water to the member and the member distributes the water to the substance.

5. A device according to claim 4 wherein the annular portion further extends laterally with respect to the member second portion surfaces so that the second portion is disposed intermediately with respect to the annular portion and wherein the annular portion has a second interior surface portion which forms a cavity adjacent the member second surface so that upon positioning a cartridge which contains a substance for the preparation of a beverage in the cavity adjacent the member second surface, the member second interior surface portion surrounds a side of the cartridge.

6. A device according to claim 4 further comprising (a) annular portion lugs which extend from an outer periphery of the annular portion, (b) a holder having a hollowed interior and a base surface for containing and supporting a cartridge which contains a substance for preparation of a beverage at a position adjacent the member second surface for piercing the cartridge and extraction of the substance, (c) a support member having a base surface for supporting the holder, an annular sidewall about a hollowed interior having an interior surface which extends from the base surface and having an exterior surface, tightening lugs which extend from the exterior surface and a handle which extends from the exterior surface, wherein the support member is configured so that upon positioning of the holder containing and supporting a cartridge which contains a substance for preparation of a beverage in the support member and at a position adjacent the member second surface for piercing the cartridge and extraction of the substance, the sidewall extends into the gap and the tightening lugs extend from the exterior surface at a position for engaging the tightening ring ramps for supporting the support member, and the handle extends from the exterior surface at a position for being positioned adjacent the annular portion lugs, and further comprising (d) a pivotal connection to secure the annular portion lugs to the handle to bias the annular portion lugs and handle.

7. An apparatus for extracting a substance contained in a cartridge for preparation of a beverage comprising:
   an extraction head having a base, a water passage opening in the base, a base grill for distributing water from the opening, a peripheral portion which extends longitudinally from the base and a surface portion which extends laterally from the peripheral portion;
   a seal positioned adjacent the head surface portion;
   a tightening ring fitted to the head and having a portion which extends coaxially about and which is displaced away from the head peripheral portion to form a gap between the head peripheral portion and the tightening ring portion in which the seal is disposed and which has ramps which extend into the gap; and
   a device having:
      a member having an annular portion which extends longitudinally to an edge and which has an interior surface adapted to be fitted about the head peripheral portion whereby the annular portion extends into the gap and having a second portion which has first and second opposing surfaces which extend laterally with respect to the annular portion so that the first surface is connected with the annular portion interior surface and which have a plurality of openings which form a member grill portion for distributing water and wherein the first surface is displaced from the edge so that upon the member being fitted to the head, the edge is fitted against the seal and so that the first surface is positioned adjacent the head base grill; and
      projecting elements positioned to extend from the member second surface in a direction away from the second surface for piercing a cartridge which contains a substance for preparation of a beverage.

8. An apparatus according to claim 7 wherein the annular portion further extends laterally with respect to the member second portion surfaces so that the second portion is disposed intermediately with respect to the annular portion and wherein the annular portion has a second interior surface portion which forms a cavity adjacent the member second surface so that upon positioning a cartridge which contains a substance for preparation of a beverage in the cavity adjacent the member second surface, the member second interior surface portion surrounds the side of the cartridge.

9. An apparatus according to claim 8 further comprising a support member having a base surface for supporting an edge of a cartridge which contains a substance for the preparation of a beverage and having an annular sidewall about a hollowed interior which has an interior surface which extends from the base surface for containing the cartridge and which has an exterior surface, and having tightening lugs which extend from the exterior surface wherein the support member is configured so that upon containing and supporting a cartridge which contains a substance for preparation of a beverage at a position adjacent the member second surface for piercing the cartridge and extraction of the substance, the sidewall extends into the gap and the tightening lugs extend from the exterior surface at a position for engaging the tightening ring ramps for supporting the support member.

10. An apparatus according to claim 17 further comprising:
   a cartridge holder member having an exterior base surface and an annular exterior side surface which extends laterally from the exterior base and having an interior base surface for supporting a cartridge which contains a substance for preparation of a beverage and having an annular interior side surface which extends laterally from the base for surrounding a side of the cartridge for holding the cartridge at a position adjacent the member second surface for piercing the cartridge and extraction of the substance; and
   a support member having a base surface for supporting the holder member exterior base surface and having an annular sidewall about a hollowed interior which has an interior surface which extends from the support member base surface for containing the holder member exterior side surface and which has an exterior surface, and having tightening lugs which extend from the exterior surface wherein the support member is configured so that upon positioning of the holder containing and supporting a cartridge which contains a substance for preparation of a beverage at a position adjacent the member second surface for piercing the cartridge and extraction of the substance, the sidewall extends into the gap and the tightening lugs extend from the exterior surface at a position for engaging the tightening ring ramps for supporting the support member.

11. An apparatus according to claim 10 further comprising (a) annular portion lugs which extend from an outer periphery of the annular portion, (b) a handle which extends from the support member exterior surface at a position for being positioned adjacent the annular portion lugs, and (c) a pivotal connection to secure the annular portion lugs to the handle to bias the annular portion lugs and handle.

12. An apparatus for extracting a substance contained in a cartridge for preparation of a beverage comprising:
   an extraction head having a base, a water passage opening in the base, a base grill for distributing water from the opening, a peripheral portion which extends longitudinally from the base and a surface portion which extends laterally from the peripheral portion;
   a seal positioned adjacent the head surface portion; a tightening ring fitted to the head and having a portion which extends coaxially about and which is displaced away from the head peripheral portion to form a gap between the head peripheral portion and the tightening ring portion in which the seal is disposed and which has ramps which extend into the gap; and a device having:

a member having an annular portion which extends longitudinally to an edge and which has an interior surface adapted to be fitted about the head peripheral portion whereby the annular portion extends into the gap and having a second portion which has first and second opposing surfaces which extend laterally with respect to the annular portion, so that the first surface is connected with the annular portion interior surface, and which has a centrally disposed opening in the first surface which extends to a second surface portion which projects from the second surface for piercing a cartridge which contains a substance for preparation of a beverage and which has at least one opening for distributing water and wherein the first surface is displaced from the edge so that upon the member being fitted to the head, the edge is fitted against the seal and so that the first surface is positioned adjacent the head base grill so that the member is positioned for piercing and distributing water to a cartridge which contains a substance for preparation of a beverage so that the head base grill distributes water to the member and the member distributes the water to the substance.

13. An apparatus according to claim 12 wherein the annular portion further extends laterally with respect to the member second portion surfaces so that the second portion is disposed intermediately with respect to the annular portion and wherein the annular portion has a second interior surface portion which forms a cavity adjacent the member second surface so that upon positioning a cartridge which contains a substance for preparation of a beverage in the cavity adjacent the member second surface, the member second interior surface portion surrounds a side of the cartridge.

14. An apparatus according to claim 12 further comprising a support member having a base surface for supporting an edge of a cartridge and having an annular sidewall about a hollowed interior which has an interior surface which extends from the base surface for containing the cartridge and which has an exterior surface, and having tightening lugs which extend from the exterior surface wherein the support member is configured so that upon containing and supporting a cartridge which contains a substance for preparation of a beverage at a position adjacent the member second surface for piercing the cartridge and extraction of the substance, the sidewall extends into the gap and the tightening lugs extend from the exterior surface at a position for engaging the tightening ring ramps for supporting the support member.

15. An apparatus according to claim 12 further comprising:

a cartridge holder member having an exterior base surface and an annular exterior side surface which extends laterally from the exterior base and having an interior base surface for supporting a cartridge which contains a substance for preparation of a beverage and having an annular interior side surface which extends laterally from the base for surrounding a side of the cartridge for holding the cartridge at a position adjacent the member second surface for piercing the cartridge and extraction of the substance; and a support member having a base surface for supporting the holder member exterior base and having an annular sidewall about a hollowed interior which has an interior surface which extends from the support member base surface for containing the holder member exterior side surface and which has an exterior surface, and having tightening lugs which extend from the exterior surface wherein the support member is configured so that upon positioning of the holder containing and supporting a cartridge which contains a substance for preparation of a beverage at a position adjacent the member second surface for piercing the cartridge and extraction of the substance, the sidewall extends into the gap and the tightening lugs extend from the exterior surface at a position for engaging the tightening ring ramps for supporting the support member.

16. An apparatus according to claim 15 further comprising (a) annular portion lugs which extend from an outer periphery of the annular portion, (b) a handle which extends from the support member exterior surface at a position for being positioned adjacent-the annular portion lugs, and (c) a pivotal connection to secure the annular portion lugs to the handle to bias the annular portion lugs and handle.

* * * * *

UNITED STATES PATENT AND TRADEMARK OFFICE
CERTIFICATE OF CORRECTION

PATENT NO. : 5,398,595
DATED : March 21, 1995
INVENTOR(S) : Olivier FOND, et al.

It is certified that error appears in the above-indentified patent and that said Letters Patent is hereby corrected as shown below:

Column 10, line 46 (line 38 of claim 4), "separation" should be --preparation--.

Column 12, line 20 (line 1 of claim 10), "17" should be --7--.

Signed and Sealed this

Thirtieth Day of May, 1995

*Attest:*

BRUCE LEHMAN

*Attesting Officer*        *Commissioner of Patents and Trademarks*